(12) United States Patent
Vu

(10) Patent No.: US 9,402,501 B1
(45) Date of Patent: Aug. 2, 2016

(54) ADJUSTABLE TAMPER COFFEE APPARATUS, BREWING MACHINE UTILIZING SUCH APPARATUS, AND METHODS FOR MAKING COFFEE

(71) Applicant: SOLOFILL, LLC, Houston, TX (US)

(72) Inventor: Robert Vu, Houston, TX (US)

(73) Assignee: SOLOFILL, LLC, Houston, TX (US)

( * ) Notice: Subject to any disclaimer, the term of this patent is extended or adjusted under 35 U.S.C. 154(b) by 0 days.

(21) Appl. No.: 14/809,287

(22) Filed: Jul. 27, 2015

(51) Int. Cl.
| | |
|---|---|
| *A47J 31/00* | (2006.01) |
| *A47J 31/40* | (2006.01) |
| *A47J 31/46* | (2006.01) |
| *A47J 31/36* | (2006.01) |
| *A47J 31/06* | (2006.01) |

(52) U.S. Cl.
CPC .............. *A47J 31/40* (2013.01); *A47J 31/0642* (2013.01); *A47J 31/3623* (2013.01); *A47J 31/3676* (2013.01); *A47J 31/46* (2013.01)

(58) Field of Classification Search
CPC .............. A47J 31/0642; A47J 31/3623; A47J 31/3628; A47J 31/3676; A47J 31/369; A47J 31/3695
USPC ............................................ 99/287, 295, 323
See application file for complete search history.

(56) References Cited

U.S. PATENT DOCUMENTS

| | | |
|---|---|---|
| 5,325,765 A | 7/1994 | Sylvan |
| 5,840,189 A | 11/1998 | Sylvan |
| D408,679 S | 4/1999 | Potts |
| 6,079,315 A | 6/2000 | Beaulieu |
| 6,082,247 A | 7/2000 | Beaulieu |
| 6,142,063 A | 11/2000 | Beaulieu |
| 6,182,554 B1 | 2/2001 | Beaulieu |
| D452,433 S | 12/2001 | Lazaris |
| D452,434 S | 12/2001 | Sweeney |
| 6,440,256 B1 | 8/2002 | Gordon |
| D462,865 S | 9/2002 | Honan |
| D474,110 S | 5/2003 | Sweeney |
| D474,111 S | 5/2003 | Lazaris |
| 6,589,577 B2 | 7/2003 | Lazaris |
| 6,606,938 B2 | 8/2003 | Taylor |
| 6,607,762 B2 | 8/2003 | Lazaris |
| 6,645,537 B2 | 11/2003 | Sweeney |
| 6,655,260 B2 | 12/2003 | Lazaris |
| 6,658,989 B2 | 12/2003 | Sweeney |
| 6,666,130 B2 | 12/2003 | Taylor |
| 6,672,200 B2 | 1/2004 | Duffy |
| 6,708,600 B2 | 3/2004 | Winkler |
| D489,215 S | 5/2004 | Honan |
| D502,362 S | 3/2005 | Lazaris |
| D513,572 S | 1/2006 | Schaffeld |
| 7,165,488 B2 | 1/2007 | Bragg |
| D544,299 S | 6/2007 | Schaffeld |
| 7,347,138 B2 | 3/2008 | Bragg |
| 7,360,418 B2 | 4/2008 | Pelovitz |
| 7,377,162 B2 | 5/2008 | Lazaris |

(Continued)

*Primary Examiner* — Reginald L Alexander
(74) *Attorney, Agent, or Firm* — Gilbreth Roebuck, PC; J M (Mark) Gilbreth

(57) ABSTRACT

A coffee brewer that includes a brewing chamber, and a brewing cup filled with coffee that is removably received in the brewing chamber. The cup includes a bottom that acts as a tamping member, and this bottom is movable to vary the size of the cup reservoir. Once the cup is positioned in the brewer, the closing of the cup forces engagement of the tamping member and an engagement member positioner in the brewing chamber, resulting in the tamping member being moved to compress the coffee.

8 Claims, 12 Drawing Sheets

(56) References Cited

U.S. PATENT DOCUMENTS

| | | |
|---|---|---|
| 7,398,726 B2 | 7/2008 | Streeter |
| 7,513,192 B2 | 4/2009 | Sullivan |
| 7,523,695 B2 | 4/2009 | Streeter |
| 7,640,845 B2 | 1/2010 | Woodnorth |
| D637,484 S | 5/2011 | Winkler |
| 7,946,217 B2 * | 5/2011 | Favre ............... A47J 31/0668 426/433 |
| 8,291,812 B2 * | 10/2012 | Rivera ............... A47J 31/4407 100/211 |
| 8,720,320 B1 | 5/2014 | Rivera |
| 2004/0118290 A1 * | 6/2004 | Cai ................... A47J 31/4478 99/275 |
| 2013/0017303 A1 | 1/2013 | Vu |

* cited by examiner

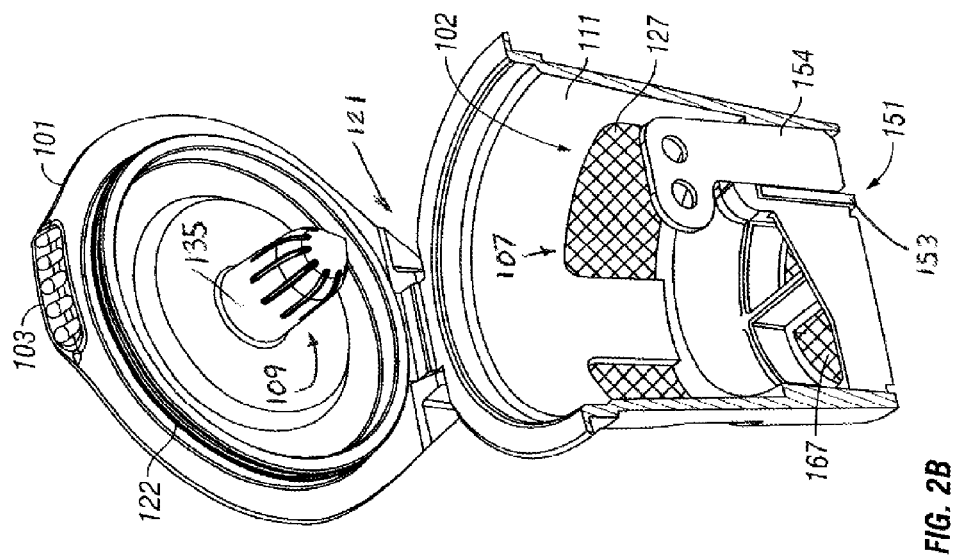
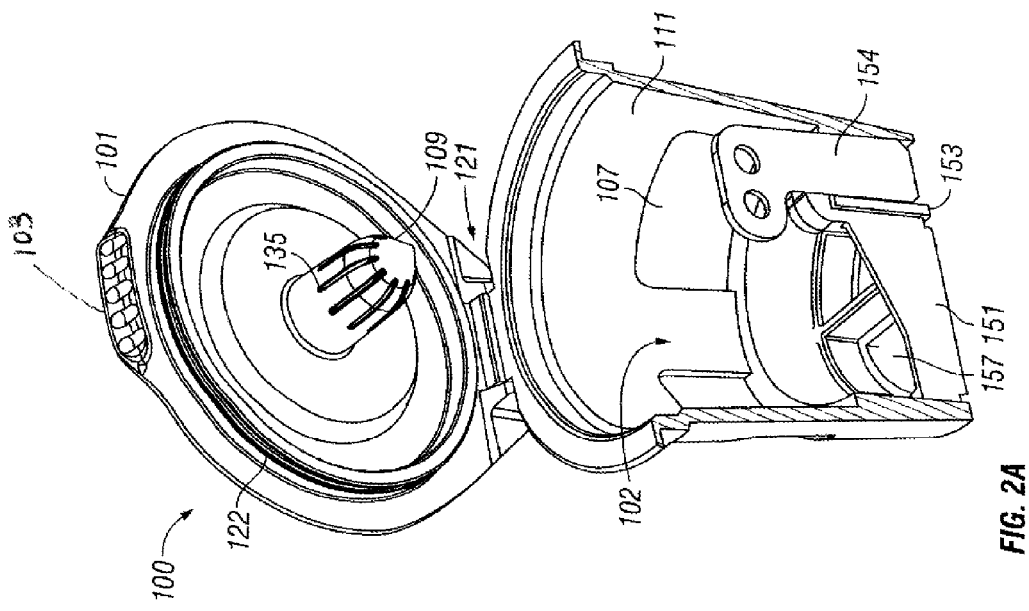

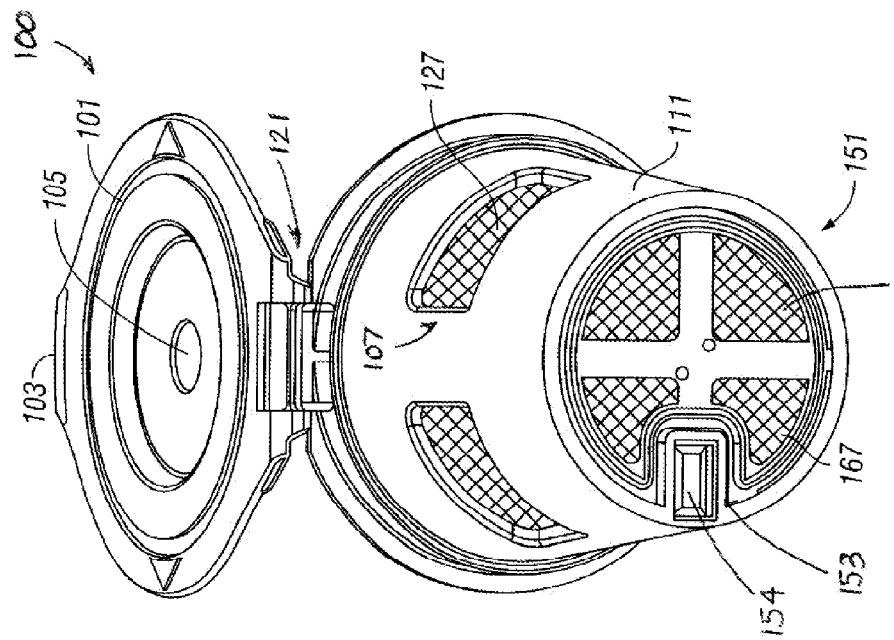
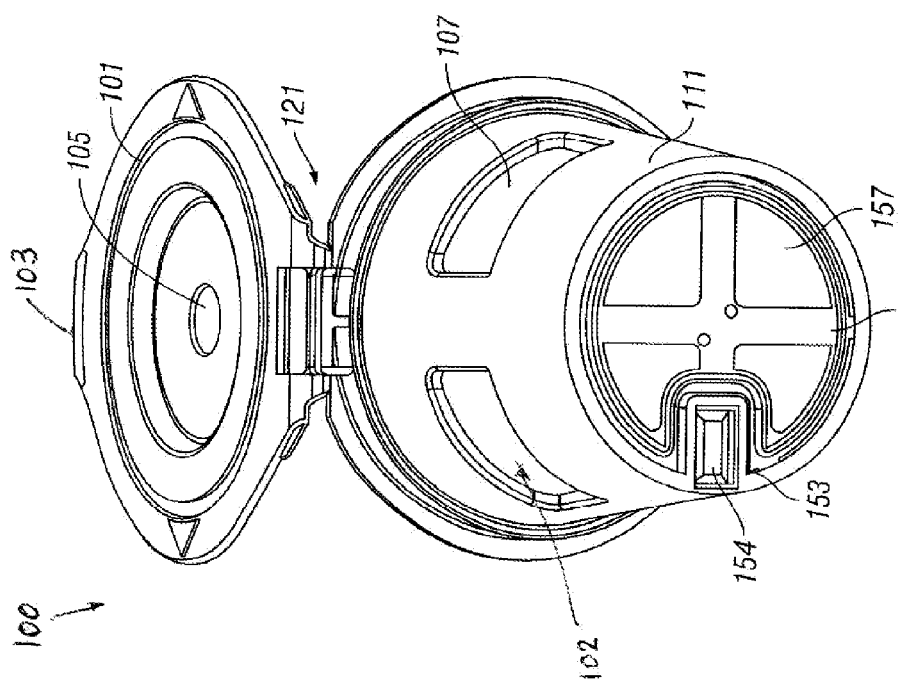

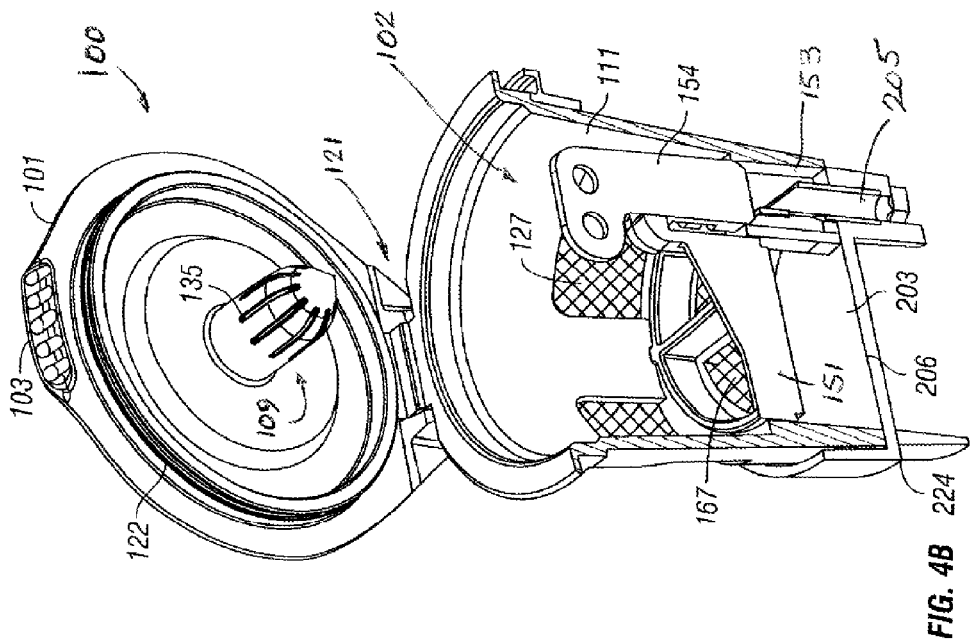
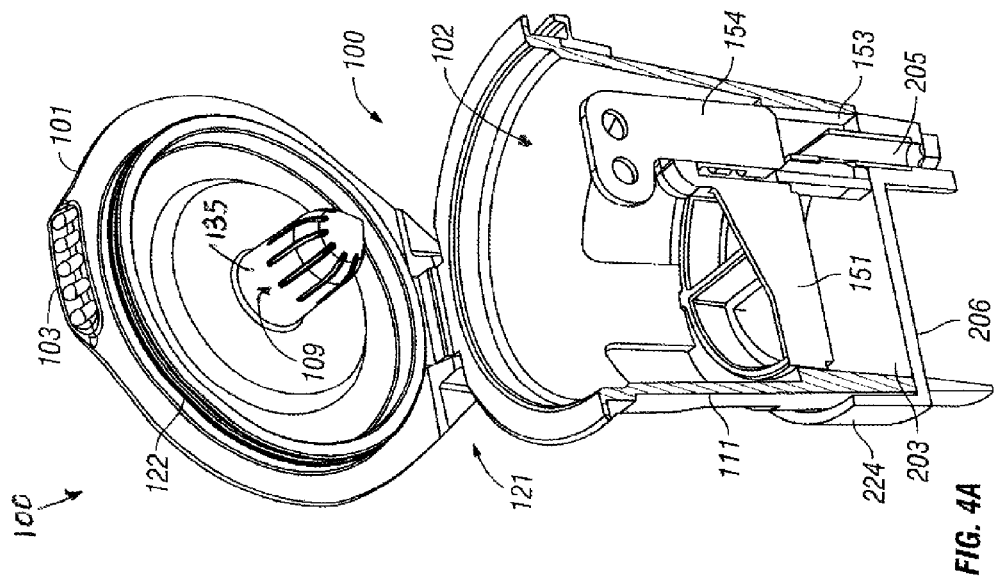

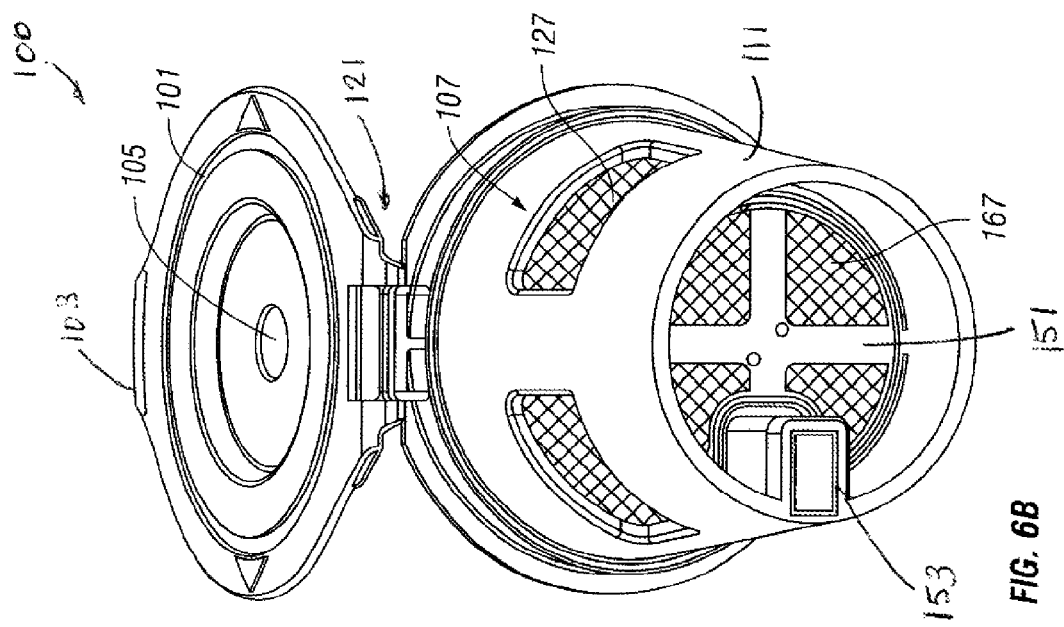
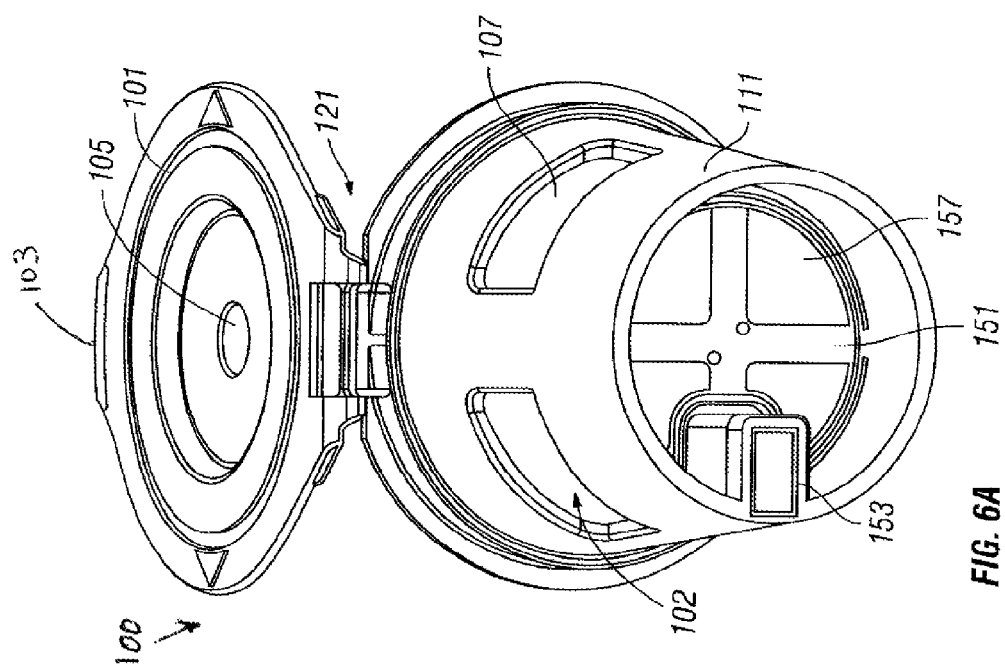

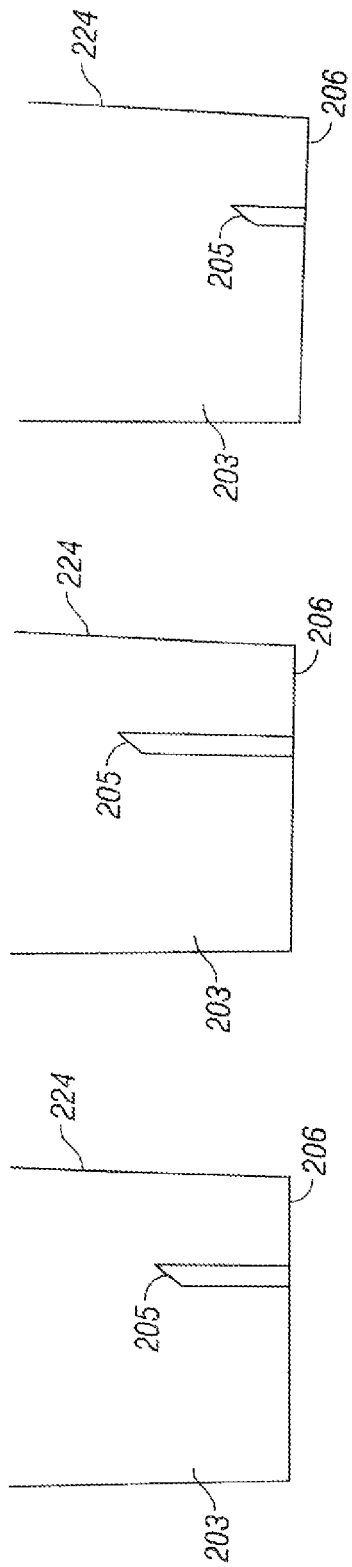
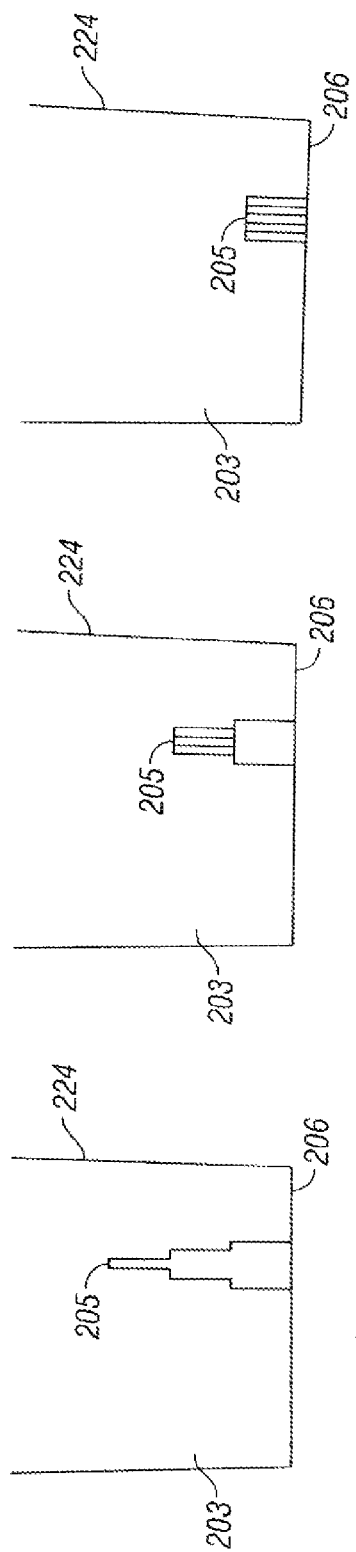

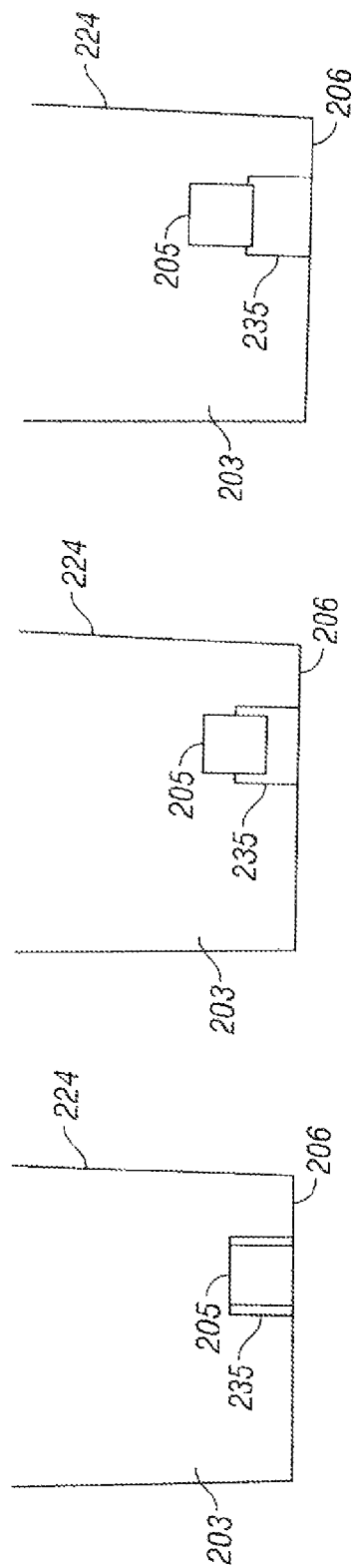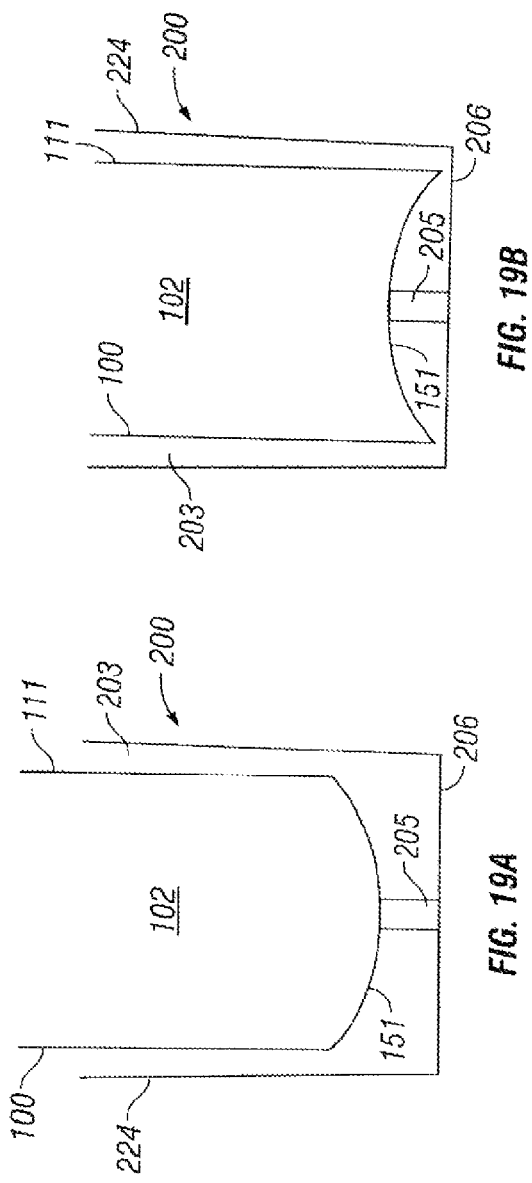

ADJUSTABLE TAMPER COFFEE APPARATUS, BREWING MACHINE UTILIZING SUCH APPARATUS, AND METHODS FOR MAKING COFFEE

RELATED APPLICATION DATA

Not applicable.

BACKGROUND OF THE INVENTION

1. Field of the Invention

The present invention relates to apparatus and products for making consumable liquids, and methods of making and using such apparatus, products and liquids. In another aspect, the present invention relates to apparatus and products for brewing such consumable liquids, and methods of making and using such apparatus, products and consumable liquids. In even another aspect, the present invention relates to apparatus and products for brewing such consumable liquids by contacting a heated liquid with solid, semi-solid, syrup or gel material, and methods of making and using such apparatus, products and consumable liquids. In still another aspect, the present invention relates to apparatus and products for brewing consumable liquids such as coffee, tea, cocoa, chocolate, herbal drinks, bullion, consume, medicinal drinks, vitamin drinks, supplement drinks, dehydrated drinks, and methods of making and using such apparatus, products and beverages. In yet another aspect, the present invention relates to disposable or reusable apparatus and products for brewing consumable liquids, and methods of making and using such apparatus. In even still another aspect, the present invention relates to disposable or reusable apparatus that may be loaded/reloaded with solids, semi-solids, syrups, and gels, for brewing consumable liquids, and methods of making and using such apparatus. In even yet another aspect, the present invention relates to disposable or reusable apparatus and methods, that may be loaded/reloaded with coffee, tea, cocoa, chocolate, herbs, spices, inhalant, seeds, berries, nuts, beans, hulls, shells, husks, vegetable matter, leaves, roots, bullion, consume, medicine, vitamins, supplements, drink powder, for brewing consumable liquids, and methods of making and using such apparatus. In even yet another aspect, the present invention relates to disposable or reusable apparatus with a variable or adjustable tamper that is used to control the steeping or brew time.

2. Brief Description of the Related Art

In the making of coffee, heated water is contacted with ground coffee to form a coffee beverage which may be consumed hot or cold.

As coffee is quite a historic drink, there is also a long history of development of various apparatus and methods for preparing coffee. Drip brewing is a method for brewing coffee which involves passing water over roasted, ground coffee beans contained in a filter. The water is generally gravity feed through the coffee, absorbing its oils and essences, and then on through the bottom of the filter. The used coffee grounds are retained in the filter with the liquid falling (dripping) into a collecting vessel such as a carafe or pot.

Very commonly, paper filters are commonly used for drip brew all over the world. For ease of operation, the used grounds and the filter are generally disposed of together, without a need to clean the filter, or with very little cleaning required. It is also common to see metal filter that are made of thin perforated metal sheets that restrain the grounds but allow the coffee to pass, thus eliminating the need to have to purchase separate filters. Additionally, many machines now use permanent plastic filters, which are made of a fine mesh.

There also exist small, portable, single serving drip brew makers that only hold the filter and rest on top of a cup. Hot water is poured in and drips directly into the cup.

A very popular item is the single-serving unit containing sufficient ground coffee, tea or other beverage material to produce a single cup of the contained beverage. In operation, this single-serving unit is inserted into a machine, with a cup placed under a discharge spout, and within a short period of time, the beverage is ready.

This type of single serving brewing machine operates by piercing the seal on top of the single serving container with a spray nozzle, while simultaneously piercing the bottom of the container with a discharge nozzle. The coffee grounds sit on a filter within the container, which filter is not punctured. The spray nozzle introduces water into the container, with the water passing through the grounds and through the filter into the waiting cup.

There are a number of patents that relate making coffee, specifically to beverage cartridges, the following of which are merely a small sampling.

U.S. Pat. No. D637,484, issued May 10, 2011, to Winkler, discloses an ornamental design for a beverage cartridge, as shown and described.

U.S. Pat. No. D502,362, issued on Mar. 1, 2005, to Lazaris et al, discloses an ornamental design for a disposable beverage filter cartridge, as shown and described.

U.S. Pat. No. 6,708,600, issued on Mar. 23, 2004, to Winkler et al, discloses the puncturing and venting of single serve beverage filter cartridge. A liquid inlet probe for piercing the lid of a beverage filter cartridge comprises a cylindrical inner hub surrounded by an enlarged diameter outer sleeve. Support ribs extend radially between and coact with the exterior of the hub and the interior of the sleeve to define a plurality of liquid supply passages. The hub, ribs and sleeve having bevelled lower ends arranged in a truncated conical alignment converging towards the center of the probe to a pointed end projecting downwardly from its lower end.

U.S. Pat. No. 6,658,989, issued on Dec. 9, 2003, to Sweeney et al, discloses are-usable beverage filter cartridge for use in a single serve beverage brewer in which a measured charge of a dry beverage medium is infused with a metered amount of heated liquid to produce a beverage medium. The reusable beverage filter cartridge is provided for containing the beverage medium and for accommodating an inflow of the heated liquid and an outflow of the beverage medium. The cartridge comprises a cup-shaped housing having a top opening and a closed bottom with an outlet port. A filter internally subdivides the housing into a first chamber accessible via the top opening and configured and dimensioned to contain the beverage medium, and a second chamber communicating with the outlet port. A lid is removably secured to the housing in a position closing the top opening, and an inlet port in the lid serves to admit heated liquid into the first chamber for infusion with the beverage medium contained therein. The filter is permeable to accommodate a flow therethrough of the resulting beverage into the second chamber from which it exits via the outlet port.

U.S. Pat. No. 6,645,537, issued on Nov. 11, 2003, to Sweeney et al, discloses a beverage filter cartridge that includes a cup-shaped outer container with a bottom and a side wall extending upwardly from the bottom wall to a circular rim surrounding an upper opening. The side wall has an upper section extending downwardly from the rim to an intermediate section, and a tapered lower section configured to provide a plurality of circumferentially spaced flutes extending downwardly from the intermediate section to the bottom wall. A filter element subdivides the interior of the container into first and second chambers. A beverage medium is stored in the first chamber. A cover is joined to the side wall at the rim to close the upper opening. The cover is yieldably piercable to accommodate an injection of liquid into the first chamber for combination with the beverage medium to produce a beverage. The filter element is permeable to accommodate a flow of the beverage from the first chamber into the second chamber, and the bottom wall is yieldably piercable to accommodate an outflow of the beverage from the second chamber to the exterior of the cartridge.

U.S. Pat. No. 6,607,762, issued on Aug. 19, 2003 and U.S. Pat. No. 6,589,577, issued on Jul. 8, 2003, to Lazaris et al, both disclose a disposable single serve beverage filter cartridge comprising an outer container with an access opening. A filter element is received in and configured and arranged to subdivide the interior of the container into first and second chambers. A beverage medium is stored in the first chamber. A lid closes the access opening. The lid has a first section overlying the first chamber and a second section overlying the second chamber. The first section of the lid is yieldably piercable to accommodate an inflow of liquid into the first chamber for infusion with the beverage medium to produce a beverage. The filter element is permeable to accommodate a flow of the beverage from the first chamber into the second chamber, and the second section of the lid is yieldably piercable to accommodate an outflow of the beverage from the second chamber to the exterior of the cartridge.

U.S. Pat. No. 6,606,938, issued on Aug. 19, 2003, to Taylor, discloses a two step puncturing and venting of single serve filter cartridge in a beverage brewer. In a method and apparatus for brewing a beverage from a dry beverage medium contained in a disposable cartridge, the cartridge is initially pierced and vented by a tubular outlet probe, and then pierced by a tubular inlet probe. Heated liquid is admitted to the cartridge interior via the inlet probe for combination with the beverage medium to produce a beverage, and the beverage is extracted from the cartridge via the outlet probe.

U.S. Pat. No. 5,840,189, issued on Nov. 24, 1998, to Sylvan et al, discloses a beverage filter cartridge that includes an impermeable yieldably pierceable base having a predetermined shape and an access opening at one end. A self-supporting wettable filter element is disposed in the base and is permanently sealed to an interior surface of the base. The filter element subdivides the base into first and second chambers, a first chamber for storing an extract of the beverage to be made, and a second empty chamber for accessing the beverage after the beverage outflow from the filter has been made by combining a liquid with the extract. An impermeable, yieldably pierceable, imperforate cover is sealingly engaged with the top of the base to form an impermeable cartridge.

U.S. Pat. No. 5,325,765, issued on Jul. 5, 1994, to Sylvan et al, discloses a beverage filter cartridge that includes an impermeable pierceable base having a predetermined shape and an opening at one end; a self-supporting wettable filter element disposed in the base sealingly engages with the opening in the base and has a form different and smaller than the predetermined shape of the base so that the filter element diverges from the base and divides the base into two sealed chambers, a first chamber for storing an extract of the beverage to be made, and a second empty chamber for accessing the beverage after the beverage outflow from the filter has been made by combining a liquid with the extract; and an impermeable pierceable cover sealingly engaged with the opening in the base to form an impermeable cartridge.

U.S. Pat. No. 7,640,845, issued Jan. 5, 2010, Woodnorth, et al., discloses a drain for beverage forming machine.

U.S. Pat. No. 7,523,695, issued Apr. 28, 2009, to Streeter et al, discloses a system for dispensing metered volumes of heated water to the brew chamber of a single serve beverage brewer.

U.S. Pat. No. 7,513,192, issued Apr. 7, 2009, to Sullivan et al, discloses a beverage forming device with opening/closing mechanism for a beverage cartridge receiver U.S. Pat. No. 7,398,726, issued on Jul. 15, 2008, to Streeter et al, discloses a system for dispensing metered volumes of heated water to the brew chamber of a single serve beverage brewer.

U.S. Pat. No. 7,377,162, issued on May 27, 2008, to Lazaris, discloses a method and apparatus for liquid level sensing.

U.S. Pat. No. 7,360,418, issued on Apr. 22, 2008, to Pelovitz, discloses a method and apparatus for sensing liquid level using baseline characteristic.

U.S. Pat. No. 7,347,138, issued on Mar. 25, 2008, to Bragg et al, discloses a brew chamber for a single serve beverage brewer.

U.S. Pat. No. D544,299, issued on Jun. 12, 2007, to Schaffeld et al, discloses an ornamental design for coffee brewer, as shown and described.

U.S. Pat. No. 7,165,488, issued on Jan. 23, 2007, to Bragg et al, discloses a brew chamber for a single serve beverage brewer.

U.S. Pat. No. D513,572, issued on Jan. 17, 2006, to Schaffeld et al, discloses an ornamental design for a coffee brewer, as shown and described.

U.S. Pat. No. D489,215, issued on May 4, 2004, to Honan et al, discloses a coffee brewer. The ornamental design for a coffee brewer, as shown and described.

U.S. Pat. No. 6,672,200, issued on Jan. 6, 2004, to Duffy et al, discloses a system for monitoring and controlling the operation of a single serve beverage brewer.

U.S. Pat. No. 6,666,130, issued on Dec. 23, 2003, to Taylor et al, discloses a baffle operated liquid heating and dispensing system for a single serve beverage brewer.

U.S. Pat. No. 6,655,260, issued on Dec. 2, 2003, to Lazaris et al, discloses a beverage filter cartridge holder.

U.S. Pat. No. D474,111, issued on May 6, 2003, to Lazaris, discloses an ornamental design for a cup shaped container, as shown and described.

U.S. Pat. No. D474,110, issued on May 6, 2003, to Sweeney, discloses an ornamental design for a cup shaped container, as shown and described.

U.S. Pat. No. D462,865, issued on Sep. 17, 2002, to Honan et al, discloses an ornamental design for a coffee brewer, as shown and described.

U.S. Pat. No. 6,440,256, issued on Aug. 27, 2002, to Gordon et al, discloses a method of forming and inserting filter elements in cup-shaped containers.

U.S. Pat. No. D452,434, issued on Dec. 25, 2001, to Sweeney, discloses an ornamental design for a cup shaped container, as shown and described.

U.S. Pat. No. D452,433, issued on Dec. 25, 2001, to Lazaris, discloses an ornamental design for a cup shaped container, as shown and described.

U.S. Pat. No. 6,182,554, issued on Feb. 6, 2001, to Beaulieu et al, discloses a beverage filter cartridge holder.

U.S. Pat. No. 6,142,063, issued on Nov. 7, 2000, to Beaulieu, discloses a automated beverage brewing system.

U.S. Pat. No. 6,082,247, issued on Jul. 4, 2000, to Beaulicu, discloses an apparatus for consecutively dispensing an equal volume of liquid.

U.S. Pat. No. 6,079,315, issued on Jun. 27, 2000, to Beaulieu et al, discloses a beverage filter cartridge holder.

U.S. Pat. No. D408,679, issued on Apr. 27, 1999, to Potts et al, discloses an ornamental design for a coffee brewer, as shown and described.

Other recent patents/publications include:

U.S. Pat. No. 8,720,320, issued May 13, 2014, to Rivera, discloses a pod adaptor assembly for use in combination with a single serve beverage brewer is provided. The assembly is especially designed for brewing pods in brewers configured for cup-shaped beverage extract cartridges. The assembly includes a receptacle and a cover configured to sealingly engage with the receptacle. The receptacle has a base with a raised portion which is adapted to provide a support surface for a pod. The base of the receptacle also provides an opening adapted to receive an upwardly extending puncture needle from the brewer in a manner such that the needle extends through the base and does not puncture the pod. The cover also has an opening that is adapted to receive a downwardly extending liquid injector probe from the brewer. In some implementations, spaced apart protrusions are arranged on the pod support surface thereby creating gaps to facilitate flow of brewed beverage. In other implementations, the assembly also includes a spring bias mechanism adapted to press the pod against the cover so as to create a tamping effect.

U.S. Patent Publication No. 20130017303, published Jan. 17, 2013 by Robert Vu discloses a brewing container for use with brewing machines, the container including a distribution outlet for dispersing the injected water in at least 3 directions away from vertical within the cartridge.

However, in spite of the above advancements, there exists a need in the beverage brewing art for products, apparatus and methods for brewing coffee and other consumable liquids.

There also exists a need in the beverage brewing art for reusable products, apparatus and methods for brewing coffee and other consumable liquids.

There even also exists a need in the beverage brewing art for products, apparatus and methods for more efficiently brewing coffee and other consumable liquids.

There still also exists a need in the beverage brewing art for products, apparatus and methods for more efficiently brewing coffee and other consumable liquids, in which the steeping time or the brewing strength can be varied.

There still also exists a need in the beverage brewing art for products, apparatus and methods for more efficiently brewing coffee and other consumable liquids, in which the tamping of the brewed material can be varied and/or controlled.

There yet also exists a need in the beverage brewing art for brewing containers for use in brewing machines that may be empty or pre-loaded with brewing material and/or refillable, brewing brewing machines utilizing such brewing containers, methods of making and using such brewing machines and containers.

These and other needs in the art will become apparent to those of skill in the art upon review of this specification, including its drawings and claims.

SUMMARY OF THE INVENTION

It is an object of the present invention to provide for products, apparatus and methods for brewing coffee and other consumable liquids.

It is another object of the present invention, to provide for reusable products, apparatus and methods for brewing coffee and other consumable liquids.

It is even another object of the present invention, to provide for products, apparatus and methods for more efficiently brewing coffee and other consumable liquids.

It is still another object of the present invention to provide for products, apparatus and methods for more efficiently brewing coffee and other consumable liquids, in which the steeping time or the brewing strength can be varied.

It is yet another object of the present invention to provide for products, apparatus and methods for more efficiently brewing coffee and other consumable liquids, in which the tamping of the brewed material can be varied and/or controlled.

It is even still another object of the present invention to provide for brewing containers for use in brewing machines that may be empty or pre-loaded with brewing material and/or refillable, brewing brewing machines utilizing such brewing containers, methods of making and using such brewing machines and containers.

These and other objects of the present invention will become apparent to those of skill in the art upon review of this specification, including its drawings and claims.

According to one embodiment of the present invention, there is provided a beverage brewing apparatus. The apparatus may include a brewer housing having a first component defining a brewing chamber with a bottom and with an access opening, a second component which may be opened to afford access to said brewing chamber via said access opening and which may be closed to coact in sealing engagement with said first component to close said access opening, and having an engagement portion. The apparatus may also include an impermeable brewing cup removably received in said brewing chamber, the brewing cup comprising a liquid impermeable cup housing defining a reservoir with a brewing material positioned therein, the cup housing comprising a tamping member wherein the tamping member is movable into and out of the reservoir to vary the size of the reservoir. Generally, the engagement portion is within the brewing chamber and in contact with the tamping member, and when the second component is opened, holds the tamping member a set off distance from the bottom of the brewing chamber. Further, once the second component is closed, the second component forces the housing portion to move toward the bottom of the brewing chamber while the engagement portion remains in contact with the tamping member and maintains the tamping member at the set off distance from the bottom of the brewing chamber, resulting in relative movement between the housing portion and the tamping member, and resulting in the tamping member being positioned a compression distance into the reservoir to compress the brewing material. In a further embodiment of this embodiment, adjustment may be made to at least one of the tamping member or the engagement portion so that the tamping member may be moved selected compression distances depending upon the adjustment. In even a further embodiment of this embodiment, at least one of the tamping member or the engagement portion is adjustable to vary the set off distance resulting in a varied compression distance once the second component is closed.

According to another embodiment of the present invention, there is provided a beverage brewing apparatus. The beverage apparatus may include a brewer housing having a first component defining a brewing chamber with a bottom and with an access opening, a second component which may be opened to afford access to said brewing chamber via said access opening and which may be closed to coact in sealing engagement with said first component to close said access opening, and having an engagement portion. The apparatus may also include an impermeable brewing cup removably received in said brewing chamber, the brewing cup comprising a liquid impermeable cup housing defining a reservoir with a brewing material contained in the reservoir, the cup housing comprising a first cup housing portion and a second cup housing portion, wherein the first cup housing portion defines a liquid entry port into the reservoir, and wherein the second cup housing portion comprises a tamping member movable into and out of the reservoir to vary the size of the reservoir, and wherein the cup housing further defines a liquid exit port. The apparatus may also include a liquid injector, that once the second component is closed, will engage the liquid entry port and be in liquid communication with the reservoir. In general, the engagement portion is positioned within the brewing chamber and in contact with the tamping member, and when the second component is opened, holds the tamping member a set off distance from the bottom of the brewing chamber. Further, once the second component is closed, the second component forces the housing portion to move toward the bottom of the brewing chamber while the engagement portion remains in contact with the tamping member and maintains the tamping member at the set off distance from the bottom of the brewing chamber, resulting in relative movement between the housing portion and the tamping member, and resulting in the tamping member being positioned a compression distance into the reservoir to compress the brewing material. In another embodiment of this embodiment, adjustment may be made to at least one of the tamping member or the engagement portion so that the tamping member may be moved selected compression distances depending upon the adjustment. In even another embodiment of this embodiment, at least one of the tamping member or the engagement portion is adjustable to vary the set off distance resulting in a varied compression distance once the second component is closed.

According to even another embodiment of the present invention, there is provided a beverage brewing apparatus. This apparatus may include a brewer housing having a first component defining a brewing chamber with a bottom and with an access opening, a second component which may be opened to afford access to said brewing chamber via said access opening and which may be closed to coact in sealing engagement with said first component to close said access opening, and having an engagement portion. This apparatus may also include an impermeable brewing cup removably received in said brewing chamber, the brewing cup comprising a liquid impermeable cup housing defining a reservoir with a beverage extract contained in the reservoir. This apparatus may also include a first tamping member comprising part of the cup housing and movable into and out of the reservoir to vary the size of the reservoir, wherein when the second component is opened holds the tamping member a first set off distance from the bottom of the brewing chamber, wherein once the second component is closed, the second component forces the housing portion to move toward the bottom of the brewing chamber while the engagement portion remains in contact with the tamping member and maintains the tamping member at the first set off distance from the bottom of the brewing chamber, resulting in relative movement between the housing portion and the first tamping member, and resulting in the first tamping member being positioned a first compression distance into the reservoir to compress the brewing material. This apparatus may also include a second tamping member positioned to be interchangeable with the first tamping member, and once interchange, comprising part of the cup housing and movable into and out of the reservoir to vary the size of the reservoir, wherein when the second component is opened holds the tamping member a second set off distance from the bottom of the brewing chamber, wherein once the second component is closed, the second component forces the housing portion to move toward the bottom of the brewing chamber while the engagement portion remains in contact with the second tamping member and maintains the second tamping member at the second set off distance from the bottom of the brewing chamber, resulting in relative movement between the housing portion and the second tamping member, and resulting in the tamping member being positioned a second compression distance into the reservoir to compress the brewing material, wherein the first set off distance is different than the second set off distance, and wherein the first compression distance is different than the second compression distance.

According to still another embodiment of the present invention, there is provided a beverage brewing apparatus. The apparatus may include a brewer housing having a first component defining a brewing chamber with a bottom and with an access opening, a second component which may be opened to afford access to said brewing chamber via said access opening and which may be closed to coact in sealing engagement with said first component to close said access opening, and having a first engagement portion. The apparatus may include an impermeable brewing cup removably received in said brewing chamber, the brewing cup comprising a liquid impermeable cup housing defining a reservoir with a brewing material positioned therein, the cup housing comprising a tamping member wherein the tamping member is movable into and out of the reservoir to vary the size of the reservoir. The apparatus may include a second engagement portion positioned to be interchangeable with the first engagement portion. Generally, the first engagement portion is within the brewing chamber and in contact with the tamping member, and when the second component is opened, holds the tamping member a first set off distance from the bottom of the brewing chamber; and wherein, once the second component is closed, the second component forces the housing portion to move toward the bottom of the brewing chamber while the first engagement portion remains in contact with the tamping member and maintains the tamping member at the first set off distance from the bottom of the brewing chamber, resulting in relative movement between the housing portion and the tamping member, and resulting in the tamping member being positioned a first compression distance into the reservoir to compress the brewing material. Further, once the second engagement portion is exchanged with the first engagement portion, the second engagement portion is within the brewing chamber and in contact with the tamping member, and when the second component is opened, holds the tamping member a second set off distance from the bottom of the brewing chamber; and wherein, once the second component is closed, the second component forces the housing portion to move toward the bottom of the brewing chamber while the second engagement portion remains in contact with the tamping member and maintains the tamping member at the second set off distance from the bottom of the brewing chamber, resulting in relative movement between the housing portion and the tamping member, and resulting in the tamping member being positioned a second compression distance into the brewing chamber to compress the brewing material. Usually, the first set off distance is different than the second set off distance, and wherein the first compression distance is different than the second compression distance.

According to yet another embodiment of the present invention, there is provided a method of brewing a brewing material. The method may include placing a brewing cup containing the brewing into a brewing chamber. May even include closing the brewing chamber which results in compression the brewing material. May even include injecting a brewing liquid into the compressed brewing material. And may even include removing a brewed beverage from the brewing chamber.

According to even still another embodiment of the present invention, there is provided a method of operating a beverage brewing apparatus. The apparatus generally includes a brewer housing having a first component defining a brewing chamber with a bottom and with an access opening, a second component which may be opened to afford access to said brewing chamber via said access opening and which may be closed to coact in sealing engagement with said first component to close said access opening, and having an engagement portion within the brewing chamber; and, an impermeable brewing cup that may be removably received in said brewing chamber, the brewing cup comprising a liquid impermeable cup housing defining a reservoir with a brewing material positioned therein, the cup housing comprising a tamping member wherein the tamping member is movable into and out of the reservoir to vary the size of the reservoir. The method may include the steps of: positioning the brewing cup within the brewing chamber such that the engagement portion contacts the tamping member and holds the tamping member a set off distance from the bottom of the brewing chamber; and closing the second component forcing the housing portion to move toward the bottom of the brewing chamber while the engagement portion remains in contact with the tamping member and maintains the tamping member at the set off distance from the bottom of the brewing chamber, resulting in relative movement between the housing portion and the tamping member, and resulting in the tamping member being positioned a compression distance into the brewing chamber to compress the brewing material;

According to even yet another embodiment of the present invention, there is provided a brewing material container for use in a brewing machine having a brewing chamber, with brewing chamber comprising an engagement portion. The container may include an impermeable brewing cup removably receivable in said brewing chamber, the brewing cup comprising a liquid impermeable cup housing defining a reservoir for holding a beverage extract, the cup housing comprising a tamping member wherein the tamping member is movable into and out of the reservoir to vary the size of the reservoir. Once the brewing chamber is closed, the tamping member is moved a compression distance into reservoir.

According to additional embodiments of the present invention, there are provided brewing containers that may be empty or pre-loaded with brewing material and/or refillable, brewing machines utilizing such brewing containers, and methods of making and using such containers and machines, all as supported by this specification.

These and other embodiments of the present invention will become apparent to those of skill in the art upon review of this specification, including its drawings and claims.

BRIEF DESCRIPTION OF THE DRAWINGS

The following drawings illustrate some of the many possible embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

FIGS. 1A, 2A, and 3A are drawings showing, respectively, an isometric top view, cut away and bottom isometric view of brewing cup 100.

FIGS. 1B, 2B, and 3B are the same as their respective FIGS. 1A, 2A, and 3A, except that flow passages 107 in the sidewalls are shown with filters 127, and flow passages 157 of base member 151 are shown with filters 167.

FIGS. 4A, 5A and 6A are drawings showing, respectively, cutaway, cutaway and bottom isometric views of brewing cup 100 showing base 151 moved into cup body 111 in a position that would compress brewing material.

FIGS. 4B, 5B, and 6B are the same as their respective FIGS. 4A, 5A, and 6A, except that flow passages 107 in the sidewalls are shown with filters 127, and flow passages 157 of base member 151 are shown with filters 167.

FIGS. 16A, 16B, and 16C show a non-limiting set of interchangeable engagement members 205 having different heights that will of course, provide different set off distances of the base 151 from brewing chamber bottom 206.

FIGS. 17A, 17B, and 17C show non-limiting adjustable engagement member 205 that is adjusted to different heights in the various figures that will of course, provide different set off distances of the base 151 from brewing chamber bottom 206.

FIGS. 18A, 18B, and 18C show another an adjustable engagement member 205 that is also adjusted to different heights in the various figures that will of course, provide different set off distances of the base 151 from brewing chamber bottom 206.

FIGS. 19A and 19B show an embodiment with variable tamping carried out with a flexible base that will flex upon being closed within the brewing chamber to provide tamping.

DETAILED DESCRIPTION OF THE INVENTION

Figure 1A:
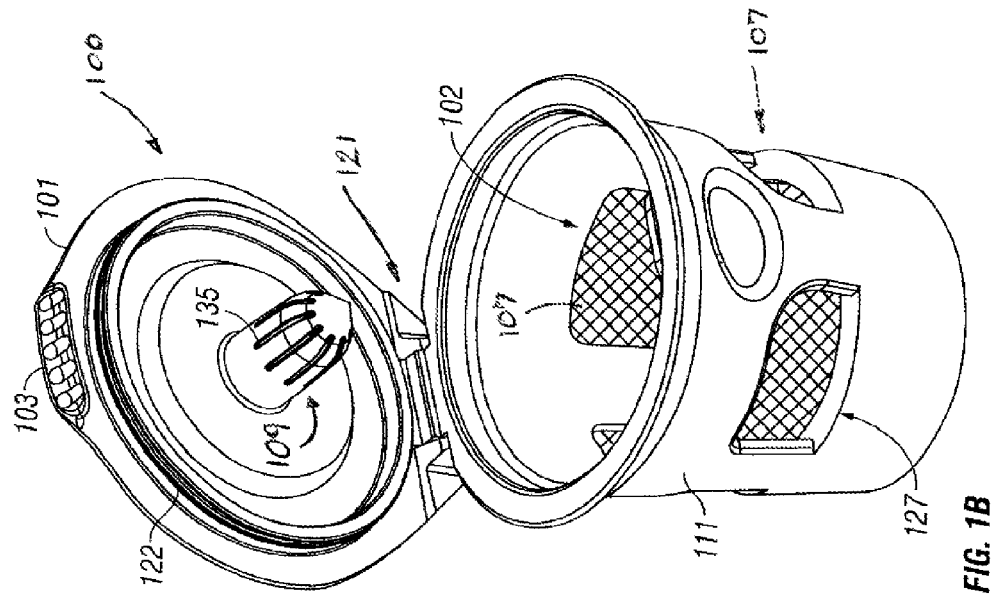

The present invention provides a disposable or reusable brewing cup that is intended for use with a brewing machine, provides a brewing machine comprising such a brewing cup, and provides methods of making and using such cup and machine. Various embodiments of the present invention also provide apparatus that includes the brewing machine having such a brewing cup. Examples of suitable brewing machines include that that are commercially available through Keurig and commonly known as K-Cup machines. A number of brewing machines suitable for use with the brewing cups of the present invention, and which may be suitable in forming the apparatus of the present invention, may be found in many of the patents and publications listed herein, including but not limited to U.S. Pat. No. 5,840,189 and U.S. Pat. No. 5,325,765, both issued to Sylvan.

Various embodiments of the present invention provide a brewing cup that may be utilized in just such machines. Further, various embodiments of the present invention provide for a brewing cup that will allow adjustment of the brewing/steeping time. The brewing/steeping time is adjusted by adjusting the amount of tamping (i.e., compaction of the brewing material) to adjust the flow rate of the brewing liquid through the brewing material.

In one aspect, the present invention may provide a disposable or reusable brewing cup that is intended for use with a brewing machine. The cup may be designed to provide a single, multiple, or carafe size serving of a consumable liquid. More particularly, the cup has base that is moveable into contact with the brewing material in order to compress the brewing material. Generally, as the cup is inserted into the brewing chamber of a brewing machine, the movable base of the cup will engage some portion of the brewing machine (for example, a needle in the current commercially available brewing machines) and the base and rest of the cup are moved relative to each other to compress the brewing material. It should be understood that in some embodiments it is the base that moves, in others it is the rest of the cup that moves past the base, and in even others they both move. Sometimes, it is an adjustable portion of the base that is engaged. It is noted that this compression will make it more difficult for the brewing liquid to pass through the brewing material and thus increase the brewing time. More compression for more brewing/steeping time, less compression for less brewing/steeping time.

In another aspect, the present invention may provide an apparatus, i.e., a brewing apparatus or system, which includes a brewing machine into which the disposable or reusable brewing cup is placed. The brewing machine will generally have a brewing chamber into which the cup is positioned. The base and the rest of the cup are moveable relative to each other in order to compress the brewing material. The effect is generally the same as if the base were moved into the brewing material. This moveable base will generally engage some portion of the brewing machine and be caused to compress the brewing material. In some embodiments, the degree of compression of the brewing material may be controlled/varied by controlling the distance which the base will move. For example, this may be done by providing adjustable stops to restrict the movement of the base, or be providing an adjustment in the base, or providing an adjustment in brewing chamber, any of which controls the engagement distance of the base with the brewing chamber. In other embodiments, two or more bases are provided, with each base designed to move a different distance to provide different compaction. In even other embodiments, multiple engagement portions are provided for the brewing machine, for example, multiple sized needles to control the distance of the base with the brewing chamber.

In another aspect, the present invention may provide a method of brewing consumable liquids using the cup with the moveable base. The method may include setting the brewing/steeping time by either setting the amount of compression provided by the moveable base and/or by adjusting the filter areas. Brewing material is loaded into the cup, with the cup placed in the brewing chamber of a brewing machine, as is well known in the art, and subsequently the brewing material is brewed with a hot liquid (usually water) being provided to the cup into contact with the brewing material.

Non-limiting examples of brewing materials which may be utilized in consumable liquids which may be prepared by the present invention include coffee, tea, cocoa, chocolate, herbs, seeds, berries, nuts, beans, hulls, shells, husks, vegetable matter, leaves, roots, bullion, consume, medicine, vitamins, supplements, and drink powder.

Non-limiting examples of consumable liquids which may be prepared with the methods, apparatus and products of the present invention, include coffee, tea, cocoa, chocolate, herbal drinks, and drinks from berries, seeds, nuts, beans, hulls, shells, husks, vegetable matter, leaves, roots, bullion, consume, medicine, vitamins, supplements, drink powder, and the like.

Non-limiting examples of products of the present invention, include single serving cups loaded with brewing material such as coffee, tea, cocoa, chocolate, herbs, seeds, berries, nuts, beans, hulls, shells, husks, vegetable matter, leaves, roots, bullion, consume, medicine, vitamins, supplements, and drink powder.

Figure 1B:
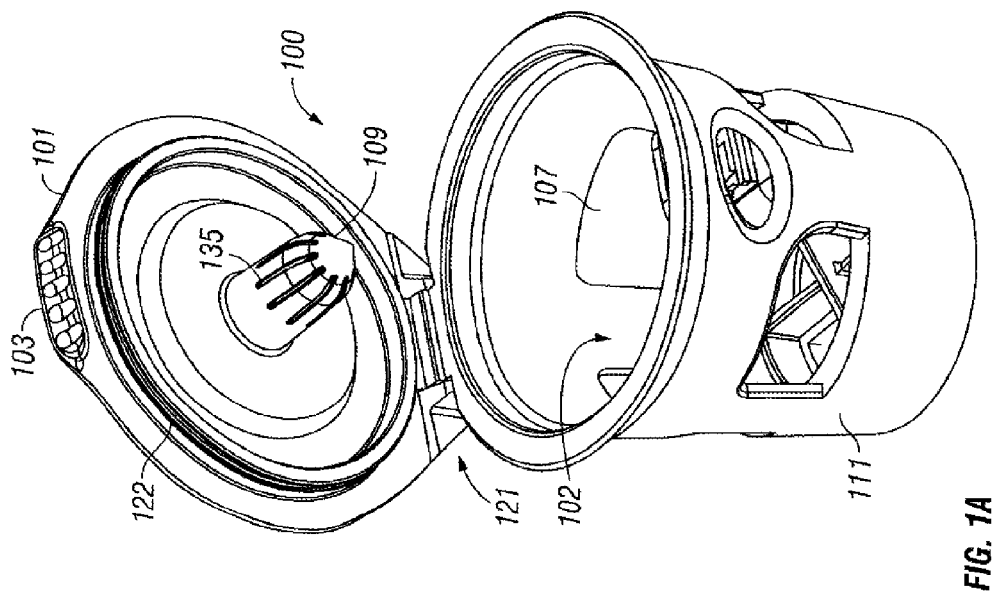

Attention is now directed to FIGS. 1A, 2A, and 3A which are respectively, an isometric top view, cut away and bottom isometric view of one non-limiting embodiment of brewing cup 100 that defines a reservoir 102. FIGS. 1B, 2B, and 3B are the same as their respective FIGS. 1A, 2A, and 3A, except that flow passages 107 in the sidewalls are shown with filters 127, and flow passages 157 of base member 151 are shown with filters 167.

The present invention is not limited to the exact embodiment of brewing cup 100 as shown. Brewing cup 100 may be disposable or reusable. While brewing cup 100 is preferably a single serving brew cup, in other embodiments it is envisioned that brewing cup 100 may provide multiple servings or even a carafe sized serving, this will all depend upon the size of reservoir 102 which will hold the brewing material, and of course the ability of the machine to receive cup 100. This brewing cup 100 may include a cup body 111, top 101, and base 151, with at least a portion of base 151 being movable within cup body 111 to provide a tamping effect on the contents of cup body 111. Reservoir 102 is defined by the body 111, top 101 and base 151. Top 101 may include an inlet passage 105 for receiving a brewing liquid from the brewing machine providing passage to optional distribution nozzle 135. Many brewing machines will include a tubular injector 205 (see, FIGS. 12-15) that is inserted into inlet passage 105 and provides brewing liquid to the cup and this injection may function as a distribution nozzle. Cup body 111 may define one or more passages 107, and base 151 may define one or more passages 157, with these passages allowing brewing liquid to exit cup 100. Cup 100 may include passages 107 or passages 157, or both passages 107 and 157. Flow passages 107 are generally covered with filters 127, and flow passages 157 of base member 151 are generally covered with filters 167. These filters 127 and 167 may be the same or different filter size and generally restrain the brewing material while allowing the brewing liquid to pass through.

Brewing cup 100 may further include grip 103 used for opening top 101, seal 122 for sealing top 101 and cup body 111, distribution nozzle 135 in liquid communication with inlet passage 105 and having one or more outlets 109, and hinge 121. Distribution nozzle 135 is not necessary, as brewing liquid may be provided directly from the brewing machine tubular injector, and this injector may also be provided with one or more outlet passages. Top 101 generally will friction fit to cup body 111.

In operation, lid 101 is operable to be opened and closed. That is, lid 101 may be operable in an open position to allow refilling of replacement of cup 100, and then operable to reseal cup 100 for brewing.

In the non-limiting embodiment as shown in FIGS. 1A, 1B, 2A, 2B, 3A, 3B, 4A, 4B, 5A, 5B, 6A and 6B, this lid 101 is affixed to cup 100 by a hinge 121. Certainly, it should be appreciated, that lid 101 may be operable with cup 100 to be opened/closed using any suitable mechanism, including a hinge, locking engagers, interlocking teeth on lid 101 and cup 100, snap fit or friction fit between lid 101 and cup 100, engaging threads on lid 101 and cup 100, external fasteners that hold lid 101 down onto cup 100, and the like. For convenience if lid 101 is not permanently attached to cup 100 (for example by something like hinge 121), it may be tethered to cup 100 to reduce the chances of loss or misplacement.

The brewing cups of the present invention are very easily utilized in the known commercially available single serve coffee machines that utilize Keurig's K-Cup pods or similar cups offered by other coffee companies. Generally, these machines will receive the K-Cup pod into a brewing chamber, and upon closing of the brewing chamber, a needle will pierce the bottom of the K-Cup pod. Most conveniently, it is this needle that the present invention will utilize in carrying out the tamping of the brewing material, however, instead of piercing the base of the brewing cup of the present invention, it will either push the base upward into the cup or in other embodiments maintain the bas in place while the rest of the cup moves down past the base, thereby tamping the brewing material therein. Certainly, any other suitable engagement mechanism other than a needle may be utilized to engage the movable base of the brewing cups of the present invention.

Figure 5B:
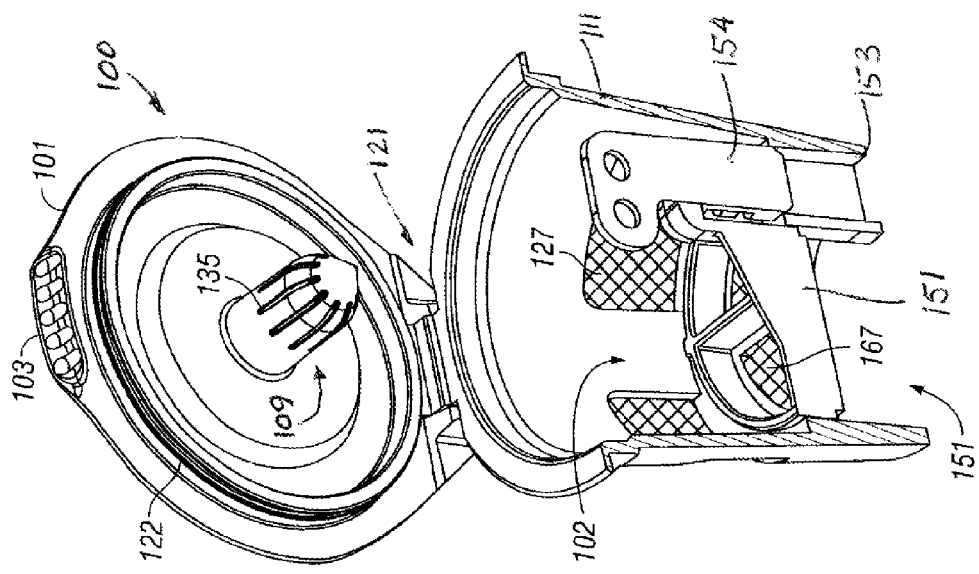
Figure 5A:
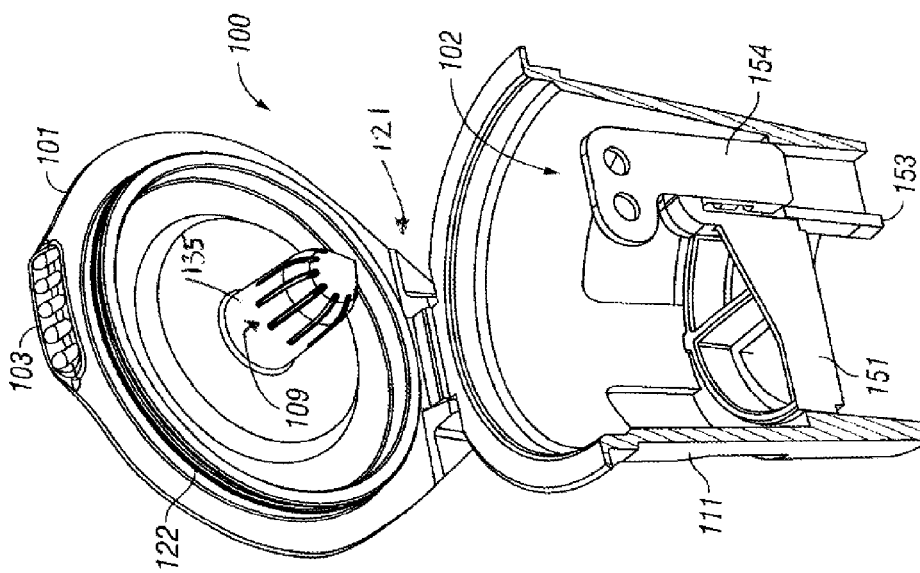
Figure 7:
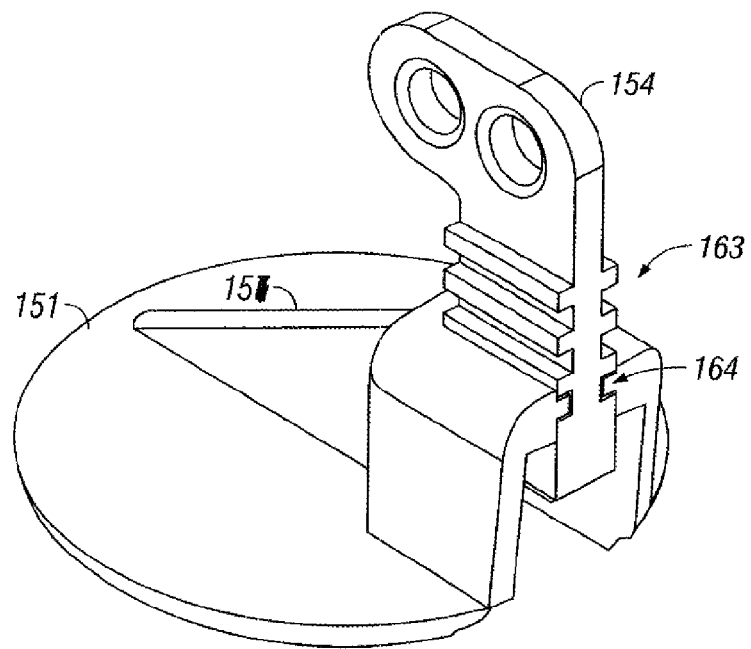
FIGS. 7 and 8 are drawings showing base member 151 having an adjustable engagement member 154, specifically, there are grooves and protrusions 163 on engagement member 154 that will interlock with grooves and protrusions 164 on base 151.
Figure 8:
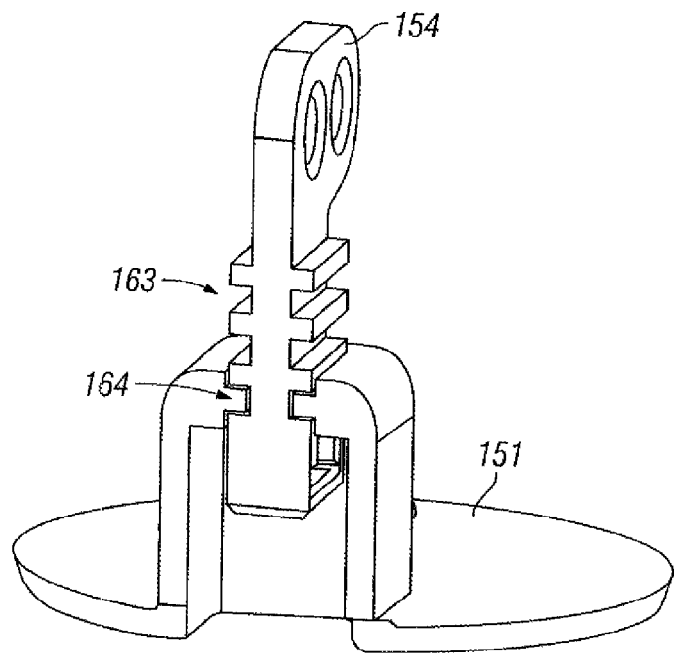

With some non-limiting embodiments of the present invention, base member 151 includes an engagement member 154, with this engagement member positioned within and movable within guide track 153. Referring additionally to FIGS. 4A, 4B, 5A, 5B, 6A and 6B, there are respectively shown cutaway, cutaway and bottom isometric views of brewing cup 100 showing base 151 positioned in cup body 111 in a position that would compress brewing material. Notice that cup body 111 has moved down past base 151. FIGS. 4B, 5B, and 6B are the same as their respective FIGS. 4A, 5A, and 6A, except that flow passages 107 in the sidewalls are shown with filters 127, and flow passages 157 of base member 151 are shown with filters 167.

As discussed, many of the current commercially available single serve coffee brewing machines have a needle that will puncture the bottom of a single serve coffee cartridge, once that cartridge is placed within a holder in the brewing chamber of the coffee machine and a handle engaged to close the brewing chamber. See, FIGS. 4A and 4B showing (a portion of) brewing chamber 203, holder 206 and needle 205. In the practice of the present invention, essentially, as brewing cup 100 is placed within holder 206 within brewing chamber 203 of such a brewing machine, needle 205 that is designed to puncture the disposable brewing cups will instead of puncturing will contact engagement member 154 and maintain its height, while the rest of cup 100 moves down past base 151. Guide track 153 allows for the relative movement between base 151 and cup body 111 to reduce the size of cup reservoir 102 and thus also compress any brewing material. As compared to FIGS. 1A, 1B, 2A, 2B, 3A, and 3B, base member 151 has been moved into a compression position in FIGS. 4A, 4B, 5A, 5B, 6A, and 6B.

In some non-limiting embodiments, at least the portion of base 151 that will contact needle 205 may comprise a soft pliable material that will allow needle 205 to slightly penetrate base 151 but not to the extent of fully penetrating base 151. This is to prolong the life of the point of needle 205, as an unyielding surface would most certainly dull needle 205 more quickly that a soft slightly penetrateable surface. Thus, in the event that a disposable K-Cup coffee pod or similar pod is utilized, needle 205 will still be able to penetrate the pod as required. Generally, base 151 will not be fully penetrated by needle 205, however, the present invention does include some non-limiting embodiments in which base 151 may be fully penetrated, and still maintained at a given height as cup body 111 moves down past it.

The above described compression of the brewing material is believed to slow down the flow of brewing liquid through the brewing material, thus increasing brewing times (i.e, there is more steeping). Thus, more compression means more steeping and less compression means less steeping.

Note that guide track 153 is not required, but is helpful for stabilizing the relative movement between base 151 and cup body 111. Other options include providing interlocking tracks/grooves on cup body 111 and base member 151. While it is believed that a freely moving base 151 will engage and compress coffee, its movements might not be stable, and thus some sort of guide system is recommended, either on the base member 151, on the engagement member 154, or on both.

The present invention is not to be limited to the embodiment of brewing cup 100. It should be understood that many suitable brewing cup may be utilized in the practice of the present invention, provided it also includes a base, with at least a portion of the base being movable within that cup body to provide a tamping effect on the contents of cup body. Brewing cups that may incorporate a movable base may be one-time disposable or may be reuseable. For example, embodiments of the present invention include any of the known disposable or reusable prior art single serve cups provided such cups are modified to include such a base. Other non-limiting examples include any of the cups 100, 200 or 300 as disclosed in U.S. Patent Publication No. 20130017303, herein incorporated by reference.

Referring additionally to FIGS. 7-11, there is shown an adjustable engagement member 154 that may be adjusted to provide variable steeping.

Figure 9:
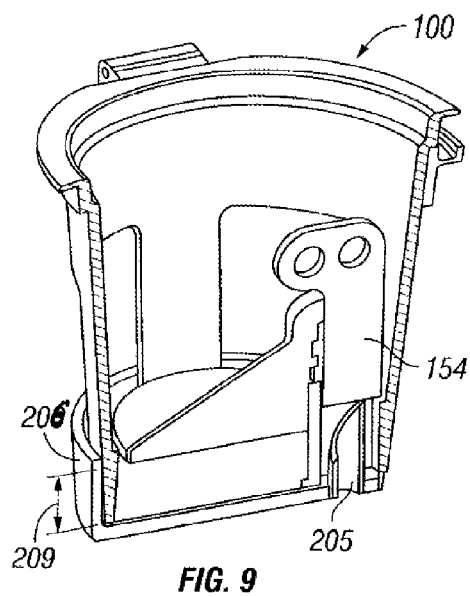
FIGS. 9, 10 and 11 are drawings showing cutaway views of cup 100 positioned in holder 206 with engagement member 154 in contact with needle 205, showing, respectively, engagement member 154 positioned for level 3 tamping, level 2 tamping, and level 1 tamping.
Figure 10:
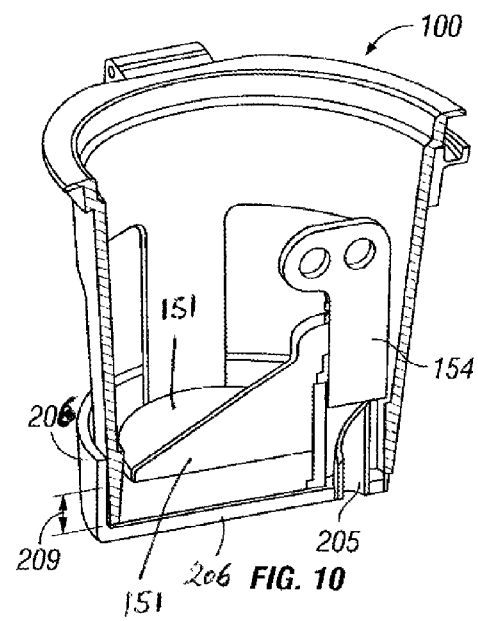
Figure 11:
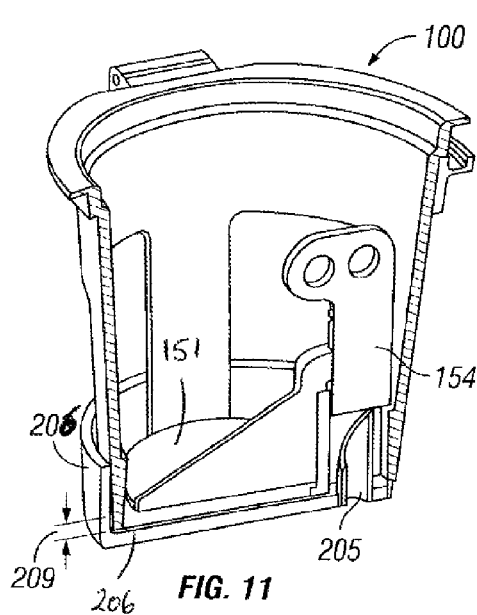

FIGS. 7-11 show base member 151 that includes an adjustable engagement member 154. Specifically, there are grooves and protrusions 163 on engagement member 154 that will interlock with grooves and protrusions 164 on base 151. In operation, adjustment is made by sliding out engagement member 154 and repositioning it at the desired level. While the embodiment as shown has 3 distinct levels, certainly any number of 2, 3, 4, 5, 6, 7, 8, 9, 10 or more distinct levels may be provided, or engagement member 154 could be adjustable by a tapered screw mechanism that would allow for an infinite positioning of engagement member 154 between a high and a low setting, or perhaps a slideable friction-fit engagement member that slides between high/low (see, FIGS. 14-15 discussed below). Brewing apparatus of the present invention will generally include a brewing chamber in which is positioned a holder 206 into which cup 100 is positioned. FIGS. 9, 10 and 11 are cutaway views of cup 100 positioned in holder 206 with engagement member 154 in contact with needle 205, showing, respectively, engagement member 154 positioned for level 3 tamping, level 2 tamping, and level 1 tamping as shown by the differences in the height 209.

Some embodiments of the present invention also include apparatus having a set of 2 or more distinct interchangeable bases for each tamping setting. That is, instead of an adjustable base, there would be 2 or more pre-set bases that are interchangeable. For example, three pre-set bases that are pre-set to provide level 3, level 2 and level 1 tamping as shown in FIGS. 9, 10 and 11, except instead of an adjustable engagement member 154, each would have a different pre-set non-adjustable engagement member 154. Each of the pre-set bases would have an engagement member at a pre-set height to provide the desired tamping level 1, 2 or 3.

Figure 12:
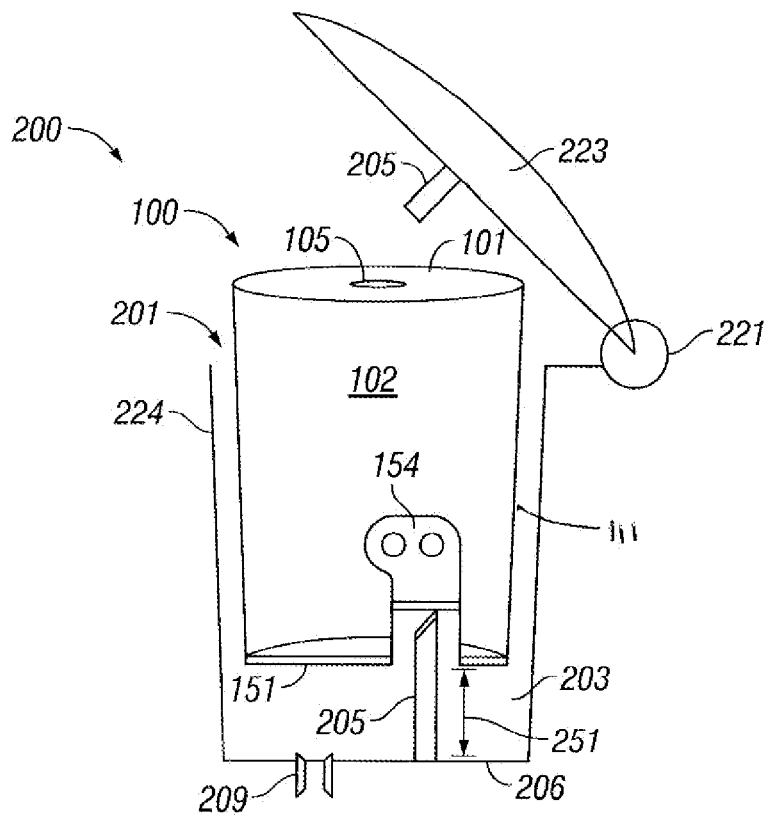
FIGS. 12 and 13 show a non-limiting embodiment of brewing cup 100 positioned within brewing chamber 202 of brewing apparatus 200.
Figure 13:
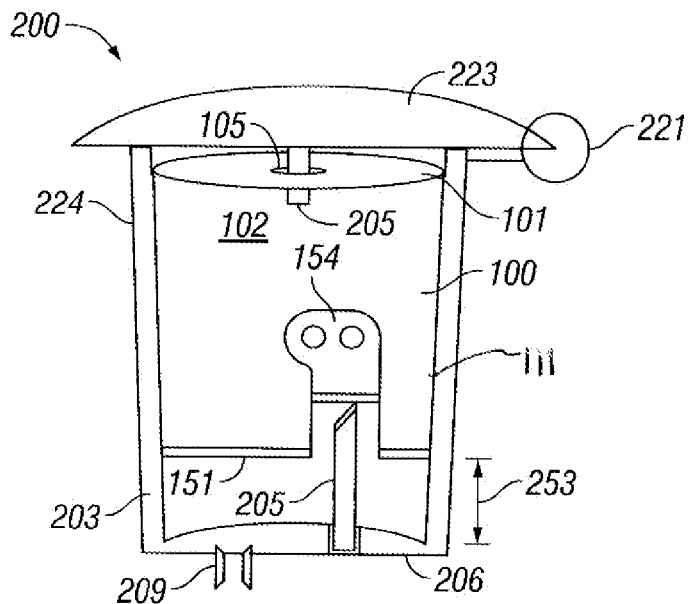

Referring additionally to FIGS. 12 and 13, there is shown a non-limiting embodiment of brewing cup 100 positioned within brewing chamber 203 of brewing apparatus 200. Some of the details of cup 100 are not shown in FIGS. 12-14, so reference may be made to FIGS. 1A, 1B, 2A, 2B, 3A, 3B, 4A, 4B, 5A, 5B, 6A and 6B.

Most commonly, for many embodiments of the present invention, brewing apparatus 200 will be a coffee brewing machine commonly commercially available for use with K-Cup pods and similar coffee pods. Examples of suitable brewing machines include that that are commercially available through Keurig and commonly known as K-Cup machines. A number of brewing machines suitable for use with the brewing cups of the present invention, and which may be suitable in forming the apparatus of the present invention, may be found in many of the patents and publications listed herein, including but not limited to U.S. Pat. No. 5,840,189 and U.S. Pat. No. 5,325,765, both issued to Sylvan.

Beverage brewing apparatus 200 may also include a brewer housing 224 having a first component or housing 224 that defines a brewing chamber 203 with a bottom 206 and with an access opening 201. A second component 223 may be generally referred to as a top, cover, cap or lid, and may be opened to afford access to said brewing chamber 203 via said access opening 201. This second component 223 may be closed to coact in sealing engagement with said first component 224 to close said access opening 201. This brewing apparatus 200 may also include an engagement portion 205. Most of the current commercially available brewing machines utilize a needle 205 to pierce the bottom of a disposable K-Cup pod, and certain embodiments of the present invention utilize that needle 205 to abut against and hold base 151 is position. This needle 205 may or more not partially penetrate into base 151. In the embodiment shown, needle 205 and engagement portion 154 are in contact, with needle 205 maintaining base 151 in position at a height 251 above the bottom of chamber 203. It should be understood, that any portion of first component 224 may be utilized to engage with base 151, for example, a raised or protruding portion of bottom 206. First component 224 and second component 223 may be hinged together as shown by hinge 221, or second component may be a fully removeable cap or lid, optionally tethered to housing 224. Brewed liquids will exit through and be collect from port 209.

Brewing apparatus 200 may also include impermeable brewing cup 100 as described above. As shown, brewing cup 100 is removably received in said brewing chamber 203, with brewing cup 100 comprising a liquid impermeable cup housing 111 that defines a reservoir 102 with brewing material contained in reservoir 102. The cup housing may include a first cup housing portion 101 that defines a liquid entry port 105 into the reservoir 102. The cup housing may further include a second cup housing portion 151 or tamping member 151 movable into and out of the reservoir 102 to vary the size of the reservoir 102. The cup housing 111 may even further define one or more liquid exit ports.

Brewing apparatus 200 may also include a liquid injector 205, that once the second component 223 is closed, will engage the liquid entry port 205 and be in liquid communication with reservoir 102, and provide liquid to reservoir 102.

As can be seen in FIG. 12, the engagement portion 205 is positioned within brewing chamber 203 and in contact with base 151 which will function as a the tamping member. More specifically, in this non-limiting embodiment, engagement member 205 is in contact with an adjustable portion 154 of tamping member 151. Notice, that when the second component 223 is opened, this engagement portion 205 maintains the base/tamping member 151 a set off distance 251 from bottom 206 of the brewing chamber 203. Note that some of the details of cup 100 are not shown in FIGS. 12-13 or are not provided a reference number, so reference may be made to FIGS. 1A, 1B, 2A, 2B, 3A, 3B, 4A, 4B, 5A, 5B, 6A and 6B for those details and for reference numbers for like items.

FIG. 13 shows brewing apparatus 200 with top 223 closed. Notice that once the second component 223 is closed, this second component 223 forces housing portion 224 to move toward bottom 206 of the brewing chamber 203 while the engagement portion 205 remains in contact with adjustable portion 154 of base/tamping member 151, and thereby maintains tamping member 151 at the set off distance from the bottom of the brewing chamber 102, resulting in relative movement between the housing portion 224 and the tamping member 151, and resulting in the tamping member 151 being positioned a compression distance 253 into the reservoir to shrink/reduce the volume of reservoir 102 and thus compress any brewing material contained within brewing chamber 102 In most cases, set off distance 251 will equal compression distance 253. While it is true that in some embodiments, engagement member 205 will penetrate tamping member 151 to some extent and/or that there may be some "give" in the materials arising from the engagement, those are usually considered negligible and in the context of the present invention set off distance 251 will be considered to equal compression distance 253 even with some penetration or give in the materials.

Figure 14:
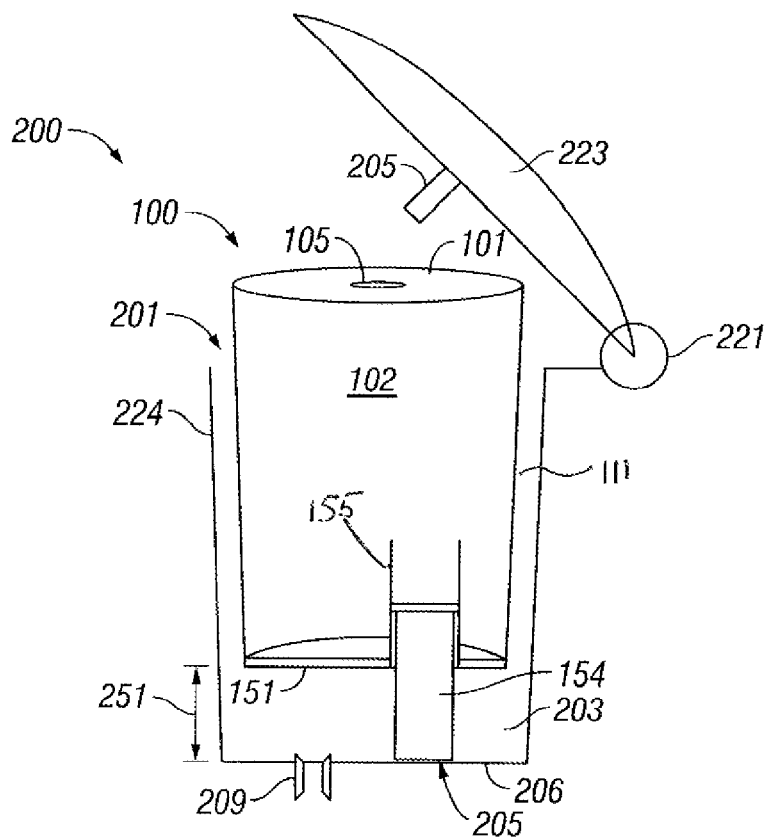
FIGS. 14 and 15 show a non-limiting embodiment of brewing cup 100 positioned within brewing chamber 202 of brewing apparatus 200.
Figure 15:
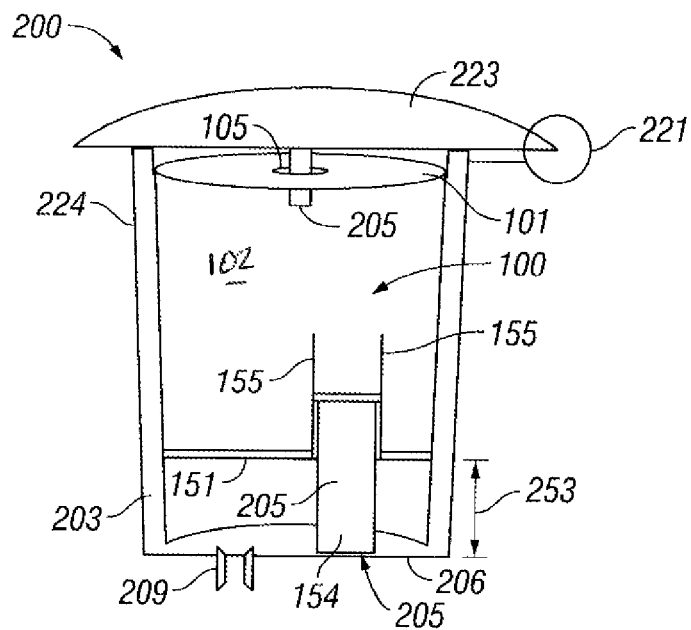

Referring additionally, to FIGS. 14 and 15, there is shown a non-limiting embodiment of brewing cup 100 positioned within brewing chamber 202 of brewing apparatus 200. Some of the details of cup 100 are not shown in FIGS. 14-15 or are not provided a reference number, so reference may be made to FIGS. 1A, 1B, 2A, 2B, 3A, 3B, 4A, 4B, 5A, 5B, 6A and 6B for those details and for reference numbers for like items. Various parts shown in FIGS. 14 and 15 are essentially the same as in the above figures, except that adjustable member 154 serves to maintain base 151 a set off distance above bottom 206, and engagement member 205 is essentially bottom 206. Adjustable member 154 is slidably adjustable within guide member 155 and in the embodiment shown is friction fit. Of course, any types of mechanism for positioning adjustment member 154 may be utilized, non-limiting examples of which include notches, snaps, grooves, threads. For example, adjustable member 154 and guide member 155 may have paired threads to allow up/down positioning of adjustable member 154.

Of course, rather than providing an adjustable base member 151, variable tamping may be provided by providing an adjustable or interchangeable engagement member 205. Referring additionally, to FIGS. 16A, 16B, 16C, 17A, 17B, 17C, 18A, 18B, and 18C, there are shown various non-limiting embodiments of engagement members 205 positioned within brewing chamber 203 as defined by housing 224. And all of these engagement members 205 may be utilized with the embodiments as described above.

FIGS. 16A, 16B, and 16C show a non-limiting set of interchangeable engagement members 205 having different heights that will of course, provide different set off distances of the base 151 from brewing chamber bottom 206. While a set of 3 are shown, it is understood that any set of 2 or more are contemplated. Certainly, the interchangeable set does not have to be in the shape of a needle, but may be any suitable regular or irregular geometric shape.

FIGS. 17A, 17B, and 17C show non-limiting adjustable engagement member 205 that is adjusted to different heights in the various figures that will of course, provide different set off distances of the base 151 from brewing chamber bottom 206. In FIG. 17A telescoping member 205 is fully extended, in FIG. 17B telescoping member 205 is partially telescoped to provide a middle height, and in FIG. 17C telescoping member is telescoped closed to provide a short height. While in the embodiment shown, the adjustable engagement member 205 is a telescoping member, is should be understood, that any suitable mechanism for varying the height of a member may be utilized.

FIGS. 18A, 18B, and 18C show another an adjustable engagement member 205 that is also adjusted to different heights in the various figures that will of course, provide different set off distances of the base 151 from brewing chamber bottom 206. In the embodiment shown, adjustable engagement member 205 is adjustable up/down within guide 235, to various heights ranging from low to medium to high heights as shown. Engagement member 205 is slidably adjustable within guide member 235 and in the embodiment shown is friction fit. Of course, any type of mechanism for engagement member 205 may be utilized, non-limiting examples of which include notches, snaps, grooves, threads. For example, engagement member 205 and guide member 235 may have paired threads to allow up/down positioning of engagement member 205.

Other embodiments of the present invention include disposable brewing cups having brewing material therein (for example coffee), and having a preset tamping level. For example, a disposable brewing cup of coffee having a movable base pre-set to provide a tight compaction level for a longer brewing time, or a disposable brewing cup of coffee having a movable base pre-set to provide a tight compaction level for a longer brewing time. It could be that different brewing materials (i.e., coffee vs. tea vs. hot cider) require different brewing times for optimum preparation, and thus could be packaged in disposable brewing cup with a moveable base pre-set for that optimum brewing level. That might also be true between different types of coffee.

In addition to a movable base, the variable tamping of the present invention may be carried out with a flexible base that will flex upon being closed within the brewing chamber to provide tamping, see, FIGS. 19A and 19B. Flexible base 151 starts out flexed outward to maximize the volume of reservoir 102. Once brewing apparatus 200 is closed, brewing cup is forced downward, resulting in engagement member 205 forcing flexible base 151 up and into reservoir 102, thereby reducing the volume of reservoir 102 and compressing brewing material therein.

While the present invention has been illustrated with a movable base, it is certainly the case that a moveable top may also be utilized to carry out the tamping of the present invention, and such would be considered to be equivalent to a moveable base.

One non-limiting embodiment of the present invention may include refilling cup 100 with a brewing material, for example coffee. Again, it should be understood that any suitable brewing material may be placed into cup 100.

All of the patents, publications, applications, articles, books, magazines, and any other prior art cited in this specification, are herein incorporated by reference.

It should be understood that while the present invention has been illustrated mainly by reference to filtration of a gas stream, it finds utility in the filtration of gas streams, liquid streams, and gas/liquid streams.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below. Regarding the independent claims, it should be understood that other independent claims may be pursued and that the present filing is only being limited to four independent claims to conform to current Track 1 filing requirements, not because the present invention is to be limited to four independent claim. Other independent claims may include other apparatus claims, product claims, and method claims as supported by this specification.

The invention claimed is:

1. A beverage brewing apparatus comprising:
    a brewer housing having a first component defining a brewing chamber with a bottom and with an access opening, a second component which may be opened to afford access to said brewing chamber via said access opening and which may be closed to coact in sealing engagement with said first component to close said access opening, and having an engagement portion; and, an impermeable brewing cup removably received in said brewing chamber, the brewing cup comprising a liquid impermeable cup housing defining a reservoir with a brewing material positioned therein, the cup housing comprising a tamping member wherein the tamping member is movable into and out of the reservoir to vary the size of the reservoir;
    wherein the engagement portion is within the brewing chamber and in contact with the tamping member, and when the second component is opened, holds the tamping member a set off distance from the bottom of the brewing chamber;
    wherein, once the second component is closed, the second component forces the housing portion to move toward the bottom of the brewing chamber while the engagement portion remains in contact with the tamping member and maintains the tamping member at the set off distance from the bottom of the brewing chamber, resulting in relative movement between the housing portion and the tamping member, and resulting in the tamping member being positioned a compression distance into the reservoir to compress the brewing material.

2. The apparatus of claim 1, wherein adjustment may be made to at least one of the tamping member or the engagement portion so that the tamping member may be moved selected compression distances depending upon the adjustment.

3. The apparatus of claim 1, wherein at least one of the tamping member or the engagement portion is adjustable to vary the set off distance resulting in a varied compression distance once the second component is closed.

4. A beverage brewing apparatus comprising:
    a brewer housing having a first component defining a brewing chamber with a bottom and with an access opening, a second component which may be opened to afford access to said brewing chamber via said access opening and which may be closed to coact in sealing engagement with said first component to close said access opening, and having an engagement portion;
    an impermeable brewing cup removably received in said brewing chamber, the brewing cup comprising a liquid impermeable cup housing defining a reservoir with a brewing material contained in the reservoir, the cup housing comprising a first cup housing portion and a second cup housing portion, wherein the first cup housing portion defines a liquid entry port into the reservoir, and wherein the second cup housing portion comprises a tamping member movable into and out of the reservoir to vary the size of the reservoir, and wherein the cup housing further defines a liquid exit port; and, a liquid injector, that once the second component is closed, will engage the liquid entry port and be in liquid communication with the reservoir;

wherein, the engagement portion is positioned within the brewing chamber and in contact with the tamping member, and when the second component is opened, holds the tamping member a set off distance from the bottom of the brewing chamber;

wherein, once the second component is closed, the second component forces the housing portion to move toward the bottom of the brewing chamber while the engagement portion remains in contact with the tamping member and maintains the tamping member at the set off distance from the bottom of the brewing chamber, resulting in relative movement between the housing portion and the tamping member, and resulting in the tamping member being positioned a compression distance into the reservoir to compress the brewing material.

5. The apparatus of claim 4, wherein adjustment may be made to at least one of the tamping member or the engagement portion so that the tamping member may be moved selected compression distances depending upon the adjustment.

6. The apparatus of claim 4, wherein at least one of the tamping member or the engagement portion is adjustable to vary the set off distance resulting in a varied compression distance once the second component is closed.

7. A beverage brewing apparatus comprising:

a brewer housing having a first component defining a brewing chamber with a bottom and with an access opening, a second component which may be opened to afford access to said brewing chamber via said access opening and which may be closed to coact in sealing engagement with said first component to close said access opening, and having an engagement portion;

an impermeable brewing cup removably received in said brewing chamber, the brewing cup comprising a liquid impermeable cup housing defining a reservoir with a beverage extract contained in the reservoir;

a first tamping member comprising part of the cup housing and movable into and out of the reservoir to vary the size of the reservoir, wherein when the second component is opened holds the tamping member a first set off distance from the bottom of the brewing chamber, wherein once the second component is closed, the second component forces the housing portion to move toward the bottom of the brewing chamber while the engagement portion remains in contact with the tamping member and maintains the tamping member at the first set off distance from the bottom of the brewing chamber, resulting in relative movement between the housing portion and the first tamping member, and resulting in the first tamping member being positioned a first compression distance into the reservoir to compress the brewing material; and, a second tamping member positioned to be interchangeable with the first tamping member, and once interchange, comprising part of the cup housing and movable into and out of the reservoir to vary the size of the reservoir, wherein when the second component is opened holds the tamping member a second set off distance from the bottom of the brewing chamber, wherein once the second component is closed, the second component forces the housing portion to move toward the bottom of the brewing chamber while the engagement portion remains in contact with the second tamping member and maintains the second tamping member at the second set off distance from the bottom of the brewing chamber, resulting in relative movement between the housing portion and the second tamping member, and resulting in the tamping member being positioned a second compression distance into the reservoir to compress the brewing material, wherein the first set off distance is different than the second set off distance, and wherein the first compression distance is different than the second compression distance.

8. A beverage brewing apparatus comprising:

a brewer housing having a first component defining a brewing chamber with a bottom and with an access opening, a second component which may be opened to afford access to said brewing chamber via said access opening and which may be closed to coact in sealing engagement with said first component to close said access opening, and having a first engagement portion; and, an impermeable brewing cup removably received in said brewing chamber, the brewing cup comprising a liquid impermeable cup housing defining a reservoir with a brewing material positioned therein, the cup housing comprising a tamping member wherein the tamping member is movable into and out of the reservoir to vary the size of the reservoir; and, a second engagement portion positioned to be interchangeable with the first engagement portion;

wherein the first engagement portion is within the brewing chamber and in contact with the tamping member, and when the second component is opened, holds the tamping member a first set off distance from the bottom of the brewing chamber; and wherein, once the second component is closed, the second component forces the housing portion to move toward the bottom of the brewing chamber while the first engagement portion remains in contact with the tamping member and maintains the tamping member at the first set off distance from the bottom of the brewing chamber, resulting in relative movement between the housing portion and the tamping member, and resulting in the tamping member being positioned a first compression distance into the reservoir to compress the brewing material;

wherein once the second engagement portion is exchanged with the first engagement portion, the second engagement portion is within the brewing chamber and in contact with the tamping member, and when the second component is opened, holds the tamping member a second set off distance from the bottom of the brewing chamber; and wherein, once the second component is closed, the second component forces the housing portion to move toward the bottom of the brewing chamber while the second engagement portion remains in contact with the tamping member and maintains the tamping member at the second set off distance from the bottom of the brewing chamber, resulting in relative movement between the housing portion and the tamping member, and resulting in the tamping member being positioned a second compression distance into the brewing chamber to compress the brewing material;

and wherein, the first set off distance is different than the second set of distance, and wherein the first compression distance is different than the second compression distance.

\* \* \* \* \*